(12) United States Patent
Rabinski

(10) Patent No.: US 6,480,651 B1
(45) Date of Patent: Nov. 12, 2002

(54) METHOD AND APPARATUS FOR ALIGNING OPTICAL COMPONENTS

(75) Inventor: Guenadi Rabinski, Nepean (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/903,498

(22) Filed: Jul. 13, 2001

(51) Int. Cl.⁷ .............................. G02B 6/26; G02B 6/42
(52) U.S. Cl. ....................................................... 385/52
(58) Field of Search .............................. 385/52, 59, 65, 385/83, 97, 98, 136, 137

(56) References Cited

U.S. PATENT DOCUMENTS

| | | | | |
|---|---|---|---|---|
| 3,907,436 A | * | 9/1975 | Wolga | 356/153 |
| 4,699,032 A | * | 10/1987 | Clark, III | 83/171 |
| 5,559,915 A | | 9/1996 | Deveau | 385/49 |
| 5,583,691 A | | 12/1996 | Yamane et al. | 359/393 |
| 5,715,341 A | | 2/1998 | Osugi et al. | 385/50 |
| 5,857,047 A | | 1/1999 | Strand et al. | 385/88 |
| 5,926,594 A | | 7/1999 | Song et al. | 385/49 |
| 5,970,192 A | | 10/1999 | Osugi et al. | 385/49 |
| 6,005,250 A | * | 12/1999 | Stickel et al. | 250/396 R |
| 6,122,423 A | | 9/2000 | You et al. | 385/49 |
| 6,144,118 A | | 11/2000 | Cahill et al. | 310/12 |
| 6,175,675 B1 | | 1/2001 | Lee et al. | 385/50 |
| 6,181,856 B1 | | 1/2001 | Brun | 385/52 |
| 6,193,226 B1 | | 2/2001 | Davies | 269/71 |

FOREIGN PATENT DOCUMENTS

GB  2 345 154  6/2000

OTHER PUBLICATIONS

"Nanopositioning" Melles Griot pp. 30.2–34.4 No date.
"Bonding Workstations" 8–20, 8–21 No date.

* cited by examiner

Primary Examiner—Javaid Nasri
(74) Attorney, Agent, or Firm—Neil Teitelbaum

(57) ABSTRACT

A method and apparatus for aligning optical components effectively locks pairs of ports in alignment, while simultaneously allowing further alignment of the same or a different pair of ports. The effective locking of pairs of ports is achieved by providing a virtual pivot point close to the ports, via a relatively fast compensating movement. In the preferred embodiment, the relatively fast compensating movement is provided by a mechanism based on a electromagnet. Since the ports are locked, i.e., are always aligned with being affected by any other activities, the instant method and apparatus for alignment is highly suitable for automation.

14 Claims, 4 Drawing Sheets

METHOD AND APPARATUS FOR ALIGNING OPTICAL COMPONENTS

FIELD OF THE INVENTION

The present application relates to a method and apparatus for aligning optical components.

BACKGROUND OF THE INVENTION

Optical components such as optical fibres, lenses, integrated optical systems, etc. are frequently aligned and coupled to one another. In general, the alignment is performed passively and/or actively. During passive alignment, the two optical components may be placed according to the expected desired orientation. During active alignment, the two optical components may be moved relative to one another while light transmitted therethrough is simultaneously monitored to determine an optimum coupling efficiency.

For integrated optical systems, such as optical integrated circuits (OICs), arrayed waveguide gratings (AWGs), planar waveguides (PW), etc., which generally have multiple channels extending to an array of ports at an end of the component, active alignment can be quite difficult. For example, consider the pigtailing of an integrated optical system, wherein each output port of the integrated optical system must be aligned and coupled to a specific optical fibre in a fibre array unit (FAU).

In many cases, to achieve optimum coupling of such multi-port components via active alignment, it is preferred that alignment be performed to a fraction of a micron and within six degrees of freedom, namely, three translational degrees of freedom and three rotational degrees of freedom.

According to one common prior art method of active alignment, an optical component having an input beam of light launched therethrough is mounted to a first jig, an integrated optical system which for example is an AWG is mounted to a second jig or post, and an FAU is mounted to a third jig. Relative movement between the optical components is controlled manually and/or automatically one degree of freedom at a time until an output signal indicating maximum coupling efficiency is achieved. More specifically, maximum coupling efficiency is determined typically for a first optical port/fibre pair, and subsequently for a second optical port/fibre pair.

Unfortunately, alignment in a first degree of freedom usually destroys alignment in a second degree of freedom. For example, alignment of the second optical port/fibre pair almost always unaligns the alignment of the first optical port/fibre pair. In the worst case scenario, the optical signal is lost and must be found again. This is usually due to the fact that the pivot points of relative movement cannot be disposed at the end of the fibre being aligned within sub-micron tolerances and/or the fact that the jigs have linear tolerances (e.g., the x, y, and z axes are not generally 100% orthogonal).

Accordingly, the prior art method typically involves moving one of the components in a first degree of freedom until optimum coupling is achieved, moving the component in a second degree of freedom until optimum coupling is achieved, repeating the step of moving the component in the first degree of freedom until optimum coupling is achieved, repeating the step of moving the component in the second degree of freedom until optimum coupling is achieved, moving the component in a third degree of freedom until optimum coupling is achieved, etc . . . This recursive process can make prior art methods of alignment very time consuming and difficult to automate.

A second disadvantage of the prior art alignment relates to the apparatuses used to provide the relative movement, which traditionally, have been based only on thumb screw drives, differential drives, and/or stepping motors. For example, stepping motors that achieve the required stepping quality are excessively slow.

Since the prior art active alignment methods have traditionally been very slow, as discussed above, alignment errors associated with the use of adhesives for securing the optically aligned components, have also arisen. For example, if an adhesive, such as epoxy, is applied after the optical components have been initially aligned, then as the epoxy hardens, it may shrink and pull the optical components out of alignment. As a result, prior art methods have compensated by using relatively low temperatures to set the epoxy so that the optical components can be finely aligned during the curing of the epoxy. This increases the time of the alignment.

Another disadvantage of prior art method/apparatuses relates to the fact that they are not easily adaptable to multi-component alignment. For example, it is common to provide only two jigs for mounting only two optical components at a time.

Melles Griot Ltd., has proposed a positioning apparatus for aligning waveguides and optical fibres that may alleviate some of the above disadvantages. The positioning apparatus uses a signal optimization system referred to as "NanoTrak", to scan and search for an optimum signal. More specifically, the apparatus includes positioners that radially move one of the components in a first search plane such that an optimum signal intensity is measured at the detector, and subsequently move the origin of the scan circle in the direction of the optimum signal intensity. The procedure is repeated iteratively until no appreciable signal gradient exists between iterations. It is further repeated for a plurality of search planes. For example, see UK Pat. Appl. GB 2 345 154, incorporated herein by reference. However, although the proposed apparatus may reduce the initial alignment time over traditional auto-alignment systems, it is limited in that in many cases the scan and track method loses the optimum signal and must find it again. This is particularly important in the alignment of multi-channel optical devices. Moreover, the proposed apparatus uses a combination of piezoelectric and stepping motors, which are used sequentially, to perform the alignment. Disadvantageously, this sequential and radial action slows down the alignment process. Further disadvantageously, piezoelectric motion is associated with hysteresis and/or drift.

SUMMARY OF THE INVENTION

It is an object of the present invention to provide a method and apparatus that obviates the above disadvantages.

It is another object of the present invention to provide a method and apparatus for efficiently aligning optical components.

Thus the present invention provides a method and apparatus for aligning optical components that effectively locks pairs of ports in alignment, while simultaneously allowing further alignment of the same or a different pair of ports. For example, in one embodiment the locked pair of ports includes a fibre end and a waveguide channel end. The effective locking of pairs of ports is achieved by providing a virtual pivot point close to the ports being aligned, via a relatively fast compensating movement of at least one of the optical components being aligned. For example, as the fibre end and waveguide channel end are moved/positioned relative to one another to improve the alignment, a relatively fast and simultaneous movement is provided to compensate for instances when the positioning movement destroys the alignment. More specifically, when the positioning movement destroys the alignment and the optical signal would otherwise be lost, the relatively fast compensating movement provides means for continuously monitoring the optical signal and recording the coordinates corresponding to the maximum optical signal. The coordinates are used to determine subsequent positioning movements.

Since the ports are locked, i.e., are always aligned with being affected by any other activities, the instant method and apparatus for alignment is suitable for automation. In the preferred embodiment, the relatively fast compensating movement is provided with at least one electromagnetic actuator.

Advantageously, the instant invention is applicable to the alignment of multi-channel optical components, multi-port optical components, and/or multi-component optical devices. With respect to the latter, the instant invention provides means for aligning three or more optical components at one time, which are sequentially positioned on the aligning jig. Furthermore, the instant invention is applicable to any solid state material that can be aligned optically.

The term 'channel', as used herein, refers to a waveguide within an optical component for propagating an optical signal. The term 'port', as used herein, refers to a location on an end face of the component for transmitting an optical signal thereto or therefrom.

In accordance with the present invention there is provided a method of aligning optical components comprising the steps of: mounting a first optical component having an input port and an output port to a first support; mounting a second optical component having an input port and an output port to a second support such that the output port of the first optical component is substantially aligned with the input port of the second optical component; launching a reference beam of light into the input port of the first optical component such that it at least partially emerges from the output port of the second optical component to provide a reference signal indicative of an optical coupling efficiency between the output port of the first optical component and the input port of the second optical component; providing relative movement between the first and second supports while monitoring resulting changes of the reference signal; providing a control signal indicative of the resulting changes of the reference signal; and providing further relative movement between the first and second supports in dependence upon the control signal such that a virtual pivot point is formed substantially at one of the output port of the first optical component and the input port of the second optical component.

In accordance with the present invention there is further provided an apparatus for aligning optical components comprising: a first support for mounting a first optical component having an input port and an output port; a second support for mounting a second optical component having an input port and an output port such that the output port of the first optical port component is substantially aligned with the input port of the second optical component; a light source for launching a reference beam of light into the input port of the first optical component; a detector for monitoring an intensity of the reference beam output the output port of the second component to provide an indication of a coupling efficiency between the first and second optical components; means for providing relative movement between the first and second optical components such that the intensity of the reference beam monitored at the output port of the second optical component is altered; and a processor for analyzing the altered intensity of the reference beam and providing feedback to the means for providing relative movement such that the means for providing relative movement are able to create a virtual pivot point substantially at one of the output port of the first optical component and the input port of the second optical component.

In accordance with the present invention there is further provided an apparatus for aligning optical components comprising: a first support for supporting a first optical component having an input port and an output port; a second support for supporting a second optical component having an input port and an output port such that the output port of the first optical port component is substantially aligned with the input port of the second optical component; a light source for launching a reference beam of light into the input port of the first optical component; a detector for monitoring an intensity of the reference beam output the output port of the second component to provide an indication of a coupling efficiency between the first and second optical components; and means for providing relative movement between the first and second optical components to affect the coupling efficiency, the means including an electromagnetic actuator capable of moving one of the first and second components in dependence upon a power applied thereto.

In accordance with the present invention there is provided a method for aligning an optical channel in a first optical element with an optical channel in a second optical element, where the optical channels extend substantially parallel to a z-axis, and where the optical elements require lateral positional alignment along x and y axes that are perpendicular to each other and the z-axis, and further require angular positional alignment, the method comprising the steps of: launching a reference signal through the optical channel of the first optical element such that it is at least partially output from the optical channel of the second optical element; laterally moving the second optical element relative to the first optical element while monitoring the reference signal output from the optical channel of the second optical element until a position is reached where the monitored reference signal indicates substantial lateral alignment of the channels of the first and second optical elements; and angularly moving the second optical element relative to the first optical element while monitoring the reference signal output from the optical channel of the second optical element until a position is reached where the monitored reference signal indicates substantial angular alignment of the channels of the first and second optical elements, wherein the angular movement is performed while maintaining the substantial lateral alignment by further laterally moving the second optical element relative to the first optical element to compensate for changes in the lateral alignment caused by the angular movement.

BRIEF DESCRIPTION OF THE DRAWINGS

Exemplary embodiments of the invention will now be described in conjunction with the drawings, in which.

It will be noted that throughout the appended drawings, like features are identified by like reference numerals.

DETAILED DESCRIPTION

Figure 1A:
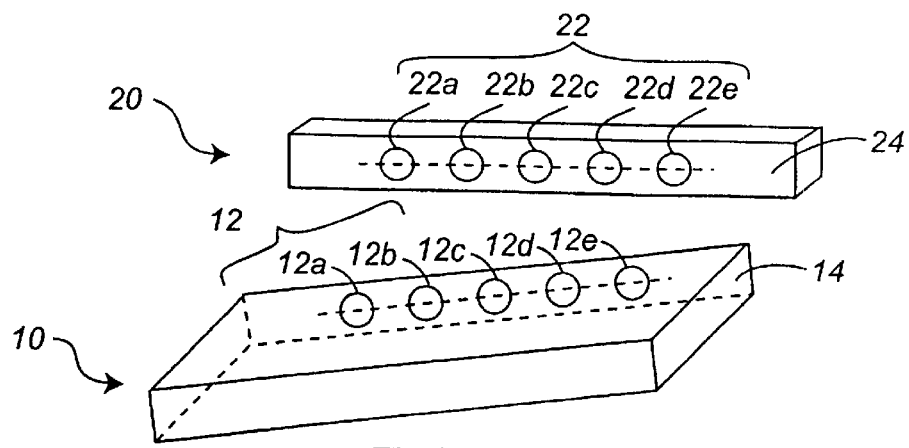
FIG. 1a is a schematic illustration of two multi-port optical components.

Referring to FIG. 1a, there is shown a first optical component 10 having an array of five ports 12. Each port (12a, 12b, 12c, 12d, and 12e) of the array 12 is aligned along a straight line at an end 14 of the optical component 10. A second optical component 20 is also shown having an array of five ports 22 for mating with first array 12. Each port (22a, 22b, 22c, 22d, 22e) of the array 22 is aligned along a straight line at an end 24 of the second optical component 20. Notably, each array on the optical component is dependent upon the manufacturing process thereof, and is subject to various manufacturing errors.

Figure 1B:
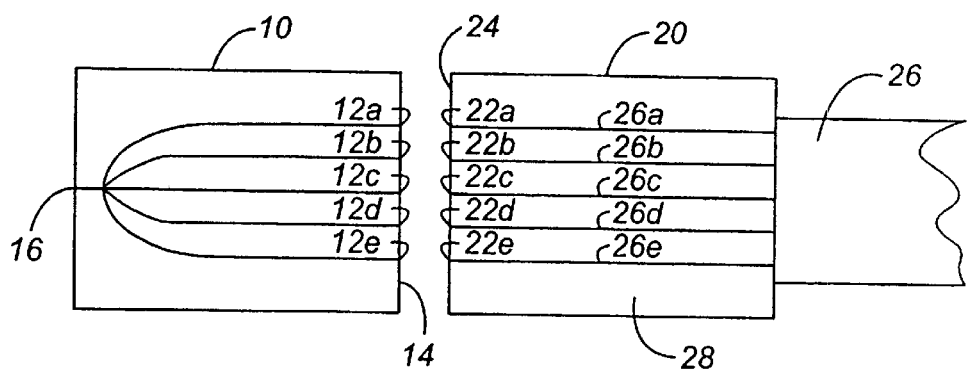
FIG. 1b is top view of the optical components shown in FIG. 1a, wherein one of the optical components is an AWG and the other is a FAU.

In FIG. 1b, the first optical component 10 is shown as an AWG having a single port 16 for receiving an optical signal including wavelengths $\lambda_1$, $\lambda_2$, $\lambda_3$, $\lambda_4$ and $\lambda_5$ and an array of output ports 12 for outputting an optical signal corresponding to each individual wavelength. More specifically, the input optical signal is transmitted through the single port 16 to a single waveguide, is split into five separate waveguides, and is output each port 12a, 12b, 12c, 12d, and 12e as optical sub-signals corresponding to wavelengths $\lambda_1$, $\lambda_2$, $\lambda_3$, $\lambda_4$ and $\lambda_5$, respectively. The second optical component 20 is shown as a FAU 20 including optical fibres 26a, 26b, 26c, 26d, 26e that are supported by fibre block 28 and extend to the end 24 of the FAU 20 at ports 22a, 22b, 22c, 22d, 22e, respectively. For example, the optical fibres 26a, 26b, 26c, 26d, 26e are optionally part of a ribbon fibre 26.

Figure 1C:
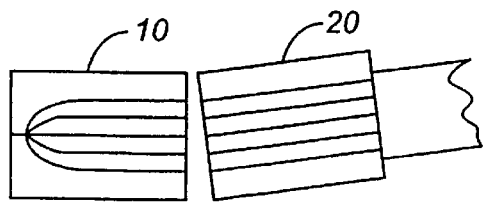
FIG. 1c is a top view showing an embodiment wherein the AWG and FAU are disposed at an angle to one another before alignment.

In considering the active alignment of these two components 10 and 20, there are various initial conditions. Referring to FIG. 1c there is shown an embodiment wherein the AWO and FAU are disposed at an angle to one another. Alternatively, or in addition, variation is introduced during manufacturing processes, such as dicing and polishing processes.

Figure 1D:
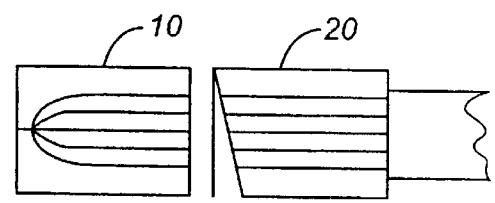
FIG. 1d is top view of an embodiment wherein the input end of the FAU has been polished at an angle.
Figure 1E:
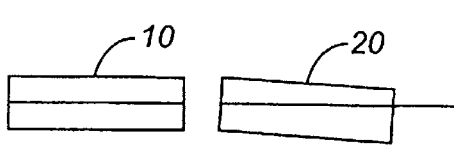
FIG. 1e is side view of an embodiment wherein the optical fibres of the FAU are not parallel to the top of the FAU.
Figure 1F:
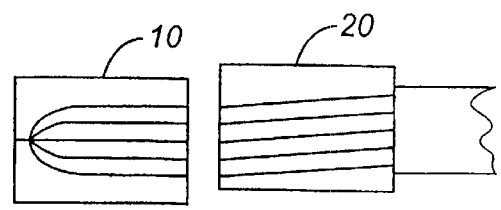
FIG. 1f is top view of an embodiment wherein the optical fibres of the FAU are not parallel to the sides of the FAU.

For example, consider variations in the FAU 20. Although the FAU 20 is usually manufactured such that optical fibres 26a, 26b, 26c, 26d, 26e are substantially parallel to one another, the same fibres are not necessarily perpendicular to the input end of the FAU 20, parallel to the top/bottom of the FAU 20, or parallel to the side surfaces of the FAU 20, as shown in FIGS. 1d, 1e, and 1f, respectively. Similar variations are also possible for the AWG 10. This misalignment increases the complexity of the alignment process, and is one of the reasons why it is desirable to actively align the optical components within six degrees of freedom.

Figure 2A:
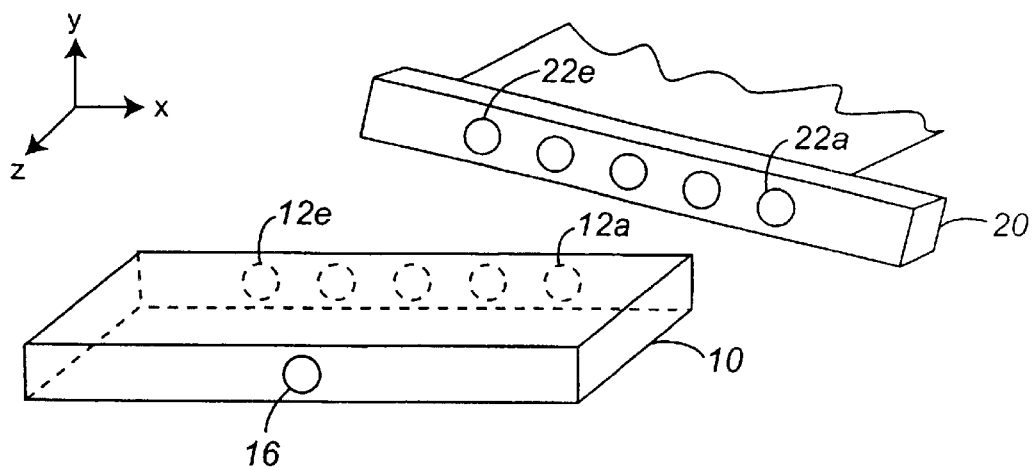
FIG. 2a is a schematic diagram of showing a first step in the alignment of the optical components shown in FIG. 1b.
Figure 2B:
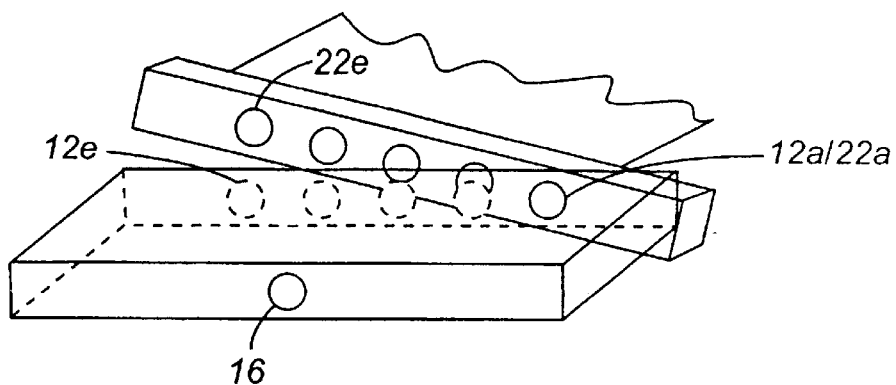
FIG. 2b is a schematic diagram of showing another second step in the alignment of the optical components shown in FIG. 1b.
Figure 2C:
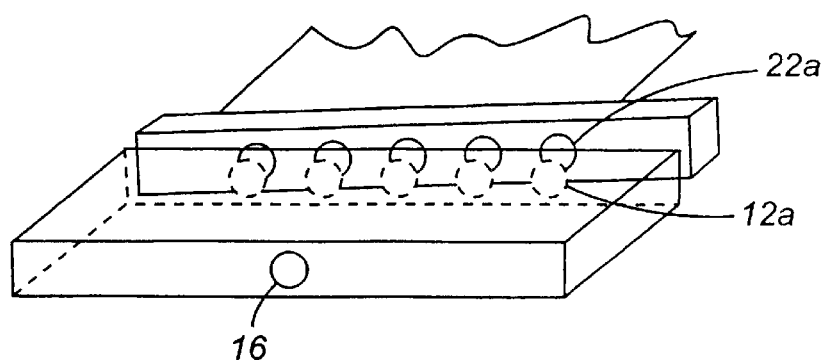
FIG. 2c is a schematic diagram of showing yet another step in the alignment of the optical components shown in FIG. 1b.

Referring to FIGS. 2a–2c, there is shown schematic diagrams of an AWG 10 and a FAU 20, that need to be aligned in various degrees of freedom. Notably, the axes of the waveguides in the AWG 10 are substantially parallel to the axis in the z-direction.

Figure 3:
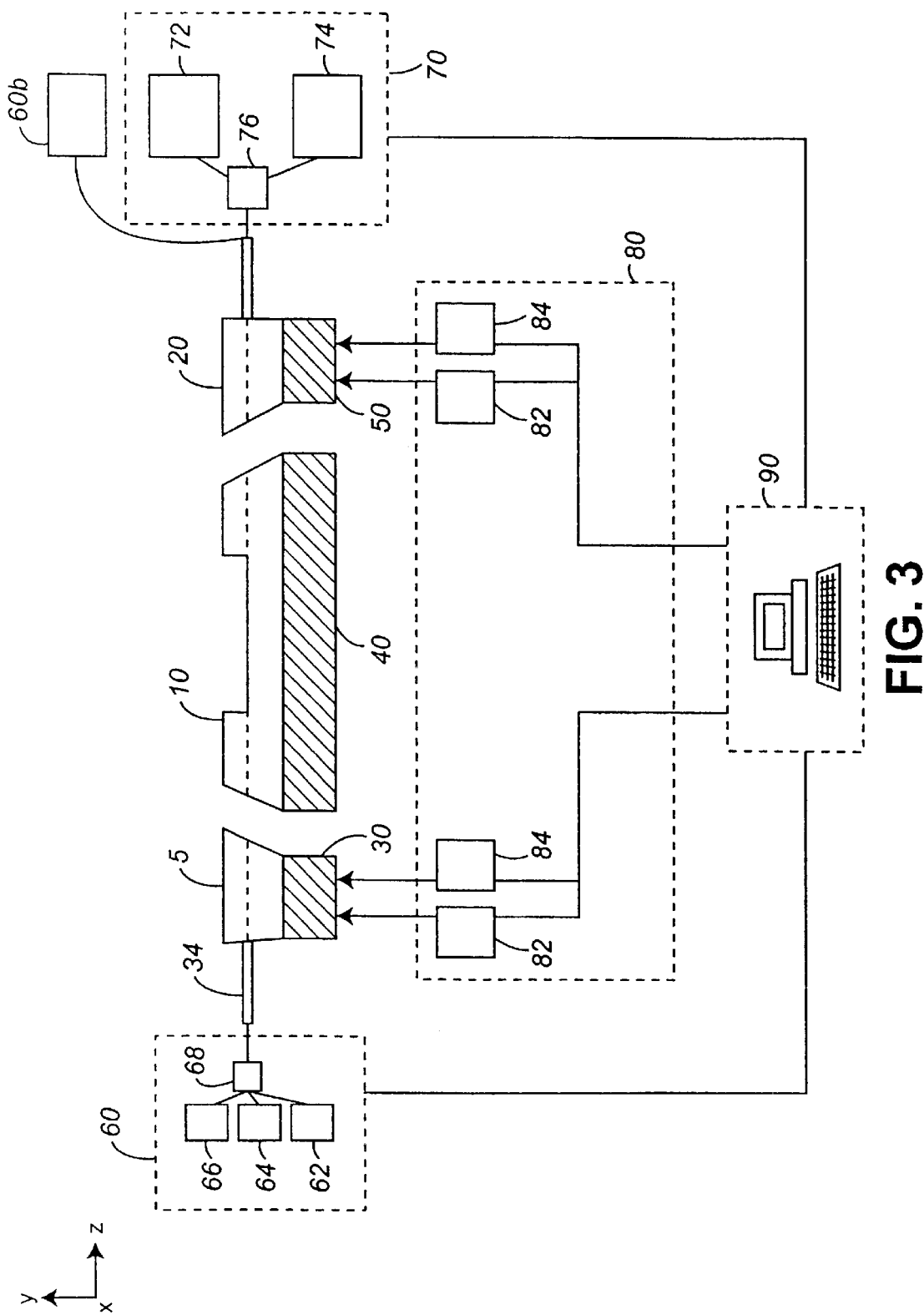
FIG. 3 is a schematic diagram of an apparatus in accordance with one embodiment of the instant invention for aligning three optical components.

Referring to FIG. 3, there is shown an embodiment of an apparatus for aligning optical components in accordance with the instant invention. The apparatus includes a first jig 30 for mounting a first optical component which is conveniently shown as an optical fibre tube 5 having an optical fibre 34 coupled thereto, a second jig 40 for mounting a second optical component which is conveniently shown as an AWG 10, and a third jig 50 for mounting a third optical component which is conveniently shown as an FAU 20. The second jig is preferably in the form of a stationary support. Notably, the AWG 10 and FAU 20 are respectively similar to the AWG 10 and FAU 20, shown in FIGS. 2a–c. In particular, each includes an array of input/output ports (i.e., 22a–22e and 12a–12e) aligned along a line in the x-direction, for coupling to the other.

The apparatus also includes a light source 60 for launching a reference signal into optical fibre 34, a detector 70 for monitoring the reference signal output from the FAU 20 and providing a control signal indicative of the reference signal, means 80 for providing relative movement between the fibre tube 5 and the AWG 10, and the AWG 10 and the FAU 20, and a processor 90 for analyzing the control signal and for calculating the coordinates and the required amount of relative movement provided by the means 80 in response to the control signal. This feedback control for the relative positioning of the jigs, and thus the respective channels/ports to be aligned allows a "virtual pivot point" between the two optical components being aligned to be formed.

In the embodiment shown in FIG. 3, the optical source 60 includes a red laser 62 for performing a rough visual alignment, a distributed feedback (DFB) laser 64 for performing alignment of the fibre tube 5 to the AWG 10, an erbium doped fibre amplifier (EDFA) source 66 for providing light over the wavelength range of the AWG 10 to perform alignment of the AWG 10 and the FAU 20, and a switch 68 for switching between each of the sources. For example, in one embodiment source 60 includes a DFBX3 source. Alternatively, the optical source includes a tunable or other laser.

The detector 70 is shown having a first detector 72 for coupling to a first output fibre of FAU 20, a second detector 74 for coupling to a second output fibre of FAU 20, and a switch 76 for switching between the first detector 72, the second detector 74, and a combination of detectors 72/74. Typically, each detector is connected to a different power meter.

The means 80 for providing relative movement is shown including a first mechanism 82 for positioning the optical components relative to one another to improve the alignment therebetween and a second mechanism 84 for compensating for instances where the positioning mechanism destroys the alignment rather than improving it. Accordingly, it is preferred that the positioning mechanism 82 have a wide dynamic range and provide a slow, stable, sequential positional motion, whereas the compensating mechanism 84 provide a faster, more accurate, and precise motion that allows the "locking-on" of the optical signal corresponding to optimum alignment. In one embodiment, the means 80 includes a positioning mechanism 82 that uses mechanical actuators or electric motors to provide relative movement in at least one degree of freedom and a compensating mechanism 84 that uses at least one electromagnetic actuator to provide relatively fast and simultaneous oscillatory movement in at least one other degree of freedom.

Figure 4:
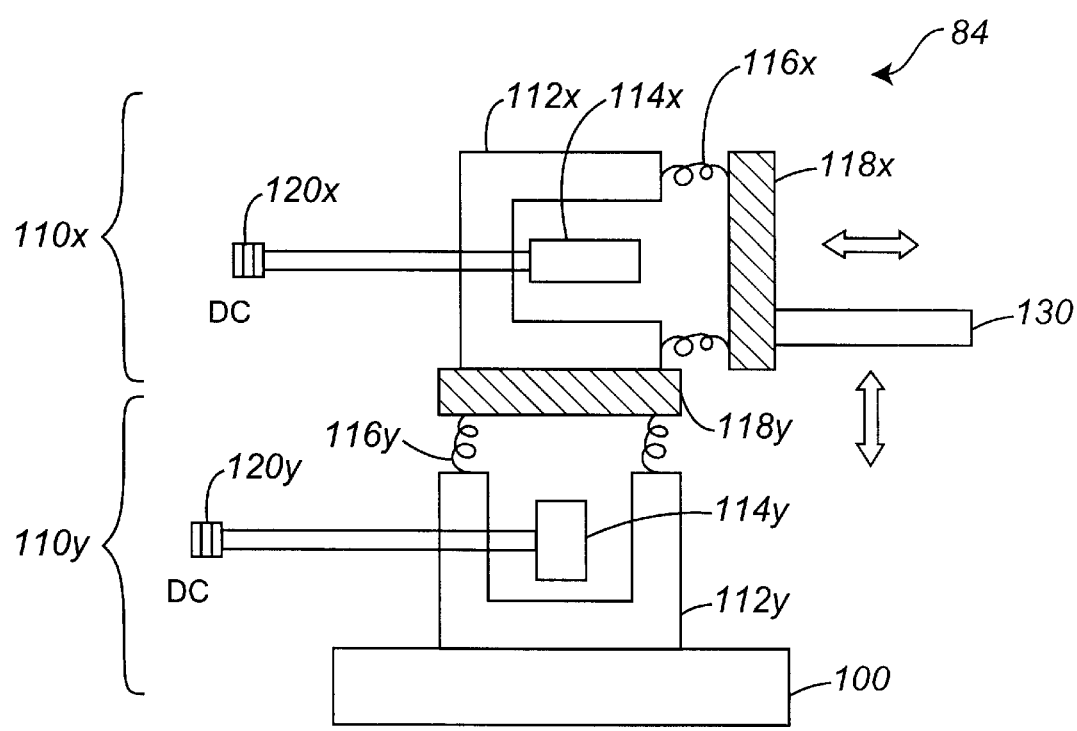
FIG. 4 is a schematic diagram of one embodiment of a compensating mechanism used in the apparatus shown in FIG. 3.

For example, a conventional 6D positioner having a plurality of motors, drive screws, etc., for providing movement in 6 degrees of freedom is suitable for use in the positioning mechanism 82, whereas the mechanism shown in FIG. 4 having first and second electromagnets for providing lateral movement respectively in two degrees of freedom is suitable for use in the compensating mechanism 84. A separate driver or controller is provided to control the relative movement of each motor and electromagnet.

Referring to FIG. 4, the compensating mechanism 84 includes a first assembly 110x for providing lateral movement in the x direction and a second assembly 110y for providing lateral movement in the y-direction. A fixed plate 100, which is preferably coupled to the positioning mechanism 82, is provided for supporting the first 110x and second 110y assemblies.

In this embodiment, each assembly includes a u-shaped support 112, an electromagnet 114, a resilient connector 116, and a ferromagnetic platen 118. Alternatively, the platen 118 is manufactured from another type of magnetic field conductive material. Each electromagnet 114 is connected to a power supply 120 such that adjustments to the applied power affect the strength of the electromagnet 114, and consequently, the degree to which the ferromagnetic platen 118 is attracted towards the u-shaped support 112. For example, if power is periodically applied to the lower electromagnet 114x with a predetermined frequency, then the lower platen 118x will oscillate up and down along the x-axis with the same predetermined frequency. Similarly, if power is periodically applied to the upper electromagnet 114y with the predetermined frequency, then the upper platen 118y will oscillate from side-to-side along the y-axis with the same predetermined frequency. Accordingly, an optical component mounted to support 130 will experience relatively fast alternating translational movement in each of the x and y directions.

Of course, embodiments using more than one electromagnet per degree of freedom, using a different shaped support 112, and/or using a different design are also possible, depending on the optical devices to be aligned.

Notably, the dynamic range of movement of the compensating mechanism 84 is limited by the applied power, the elastic range of the resilient connector 116, electrical limits of the electromagnets 114, and/or the distance between the u-shaped support 112 and the ferromagnetic platen 118. The speed of movement is limited by the frequency variation of the applied power and/or the mass of the platen and/or the mass of the optical components mounted thereto.

In general, it is preferred that the positioning mechanism 82 and compensating mechanism 84 are coupled and/or cooperate with each other such that the positioning mechanism 82 is able to extend the travelling range of the compensating mechanism 84.

Advantageously, the compensating mechanism 84 is also able to provide fine alignment between the two optical components. For example, once the positioning mechanism 82 and compensating mechanism 84 initially align the AWG 10 and FAU 20, the power applied to the electromagnetic actuator is optionally varied to provide accurate and precise relative movement between the AWG 10 and FAU 20 via the electromagnets alone.

In one embodiment, the positioning mechanism 82 is designed to provide a stepping speed of 10–20 mm/min, a stepping range of 1–10 $\mu$m/step, and a dynamic range in the order of 1–30 mm, i.e., it is able to provide translational motion for up to 30 mm in the x, y, or z-directions. In contrast, the electromagnets 114 provide a continuous sweeping motion at a speed of about 1000–1500 mm/min, have an accuracy better than 0.1 $\mu$m, and have a dynamic range in the order of 50–120 $\mu$m, i.e., the electromagnets are able to provide oscillatory motion for up to 120 $\mu$m in the x, y, or z-directions. Of course, other parameters are also possible. For example, these parameters may vary depending on the optical devices to be aligned.

In operation, red laser light from light source 60 is launched into optical fibre 34 to provide a visual indication that the fibre tube 5 and the AWG 10 are roughly aligned. The purpose of this first step is to obtain at least a small portion of the reference signal, e.g., 5%, propagating through each of the optical components to be aligned. Optionally, red laser light from a second light source 60b is launched into at least one of the output fibres of the FAU 20 to provide a visual indication that the AWG 10 and FAU 20 are roughly aligned.

Once rough alignment is evident, the fibre tube 5 is temporarily fixed in position relative to the AWG 10, for the duration of the initial alignment of the AWG 10 and the FAU 20. During initial alignment, a reference signal from the EDFA 66 is launched into the optical fibre 34 such that it is transmitted through the input port 16 of the AWG 10 and propagates through each of the channels of the AWG 10 and is output each port 12a–12e of the output array 12. The means 80 for providing relative movement are actuated to move the FAU 20 relative to the AWG 10 until a maximum intensity reading is measured at the detector 70. This is completed in two stages, as for example, shown in FIGS. 2a–2c.

In the first stage, a first channel of the AWG 10 is aligned with a first optical fibre of the FAU 20, e.g., alignment of ports 12a/22a. Accordingly, the detector switch 76 is actuated such that only the first detector 72 coupled to the first optical fibre is operative. To ensure that the first optical fibre of the FAU 20 is receiving light from the first channel of the AWG 10, and not the second or third, the means 80 moves the FAU 20 in the x-direction until the output port 12a travels past all input ports (e.g., 22c, 22b, 22a), and then moves the FAU 20 back again until the first output port 12a is substantially aligned with the input port 22a of the FAU 20.

To optically align the first output port 12a of the AWG 10 with the input port 22a of the FAU 20, the means 80 for providing relative movement is actuated to move the FAU until a maximum intensity reading is obtained at the first detector 72. More specifically, the positioning mechanism 82 moves the FAU 20 in a first degree of freedom, while the compensating mechanism 84 moves the FAU 20 in at least one other degree of freedom. In the embodiment shown in FIGS. 2a and 2b, the FAU 20 is first rotated about an axis in the x-direction while simultaneously undergoing relatively fast and alternate oscillatory translation movement in each of the x- and y-directions, and is subsequently rotated about an axis in the y-direction while simultaneously undergoing relatively fast and alternate oscillatory translational movement in each of the x- and y-directions. These two steps are optionally repeated to provide a plurality of control signals corresponding to increasing coupling efficiencies, until a maximum coupling efficiency is detected for ports 12a/22a to indicate substantial alignment therebetween.

Advantageously, this simultaneous action allows each control signal corresponding to an increased coupling efficiency to be actively monitored at the first detector—without being lost. Moreover, the co-ordinates and control signals detected at different regions within the oscillatory movements are optionally used to compensate for the imminent mis-alignment, by providing additional translational movement in either the x or y-directions to lock the alignment of ports 12a/22a. In effect, a virtual pivot point/axis is created about outer port 12a. Notably, this virtual pivot point is coincident with the intercept of each of the x and y virtual pivot axes formed for aligning outer ports 12a/22a. In most cases, the x and y virtual pivot axes are respectively different than the x and y pivot axes about which rotation is provided. Since subsequent motion does not undo previous actions, the alignment is faster and more effective than prior art alignments.

In the second stage, a second channel of the AWG 10 is aligned with a second optical fibre of the FAU 20 (e.g., alignment of ports 12e/22e). Preferably, the first optical fibre is as far apart as possible from the second optical fibre of the array. The detector switch 76 is actuated such that both the first 72 and second 74 detectors are operative. The means 80 for providing relative movement moves the FAU 20 until a maximum intensity reading is obtained at each of the first 72 and second 74 detectors.

With respect to the embodiment shown in FIGS. 2b and 2c, the FAU 20 is rotated about an axis in the z-direction with simultaneous oscillatory motion in the x- and y-directions. In other words, as the FAU 20 is rotated counterclockwise about an axis in the z-direction, a comparatively fast and short distance up-down motion is provided in the x-direction followed by a similar movement in the y-direction. This simultaneous action allows the control signal corresponding to the maximum coupling efficiency of ports 12a/22a to be constantly monitored at the first detector, while the alignment of ports 12e/22e is improved. Moreover, the co-ordinates and control signals detected at different regions within the oscillatory movements are optionally used to compensate for the imminent mis-alignment, by providing additional translational movement in either the x or y-directions to lock the alignment of the outer ports 12a/22a, while the alignment of the outer ports 12e/22e is improved.

For example, a virtual pivot axis co-axial with the optical axes of ports 12a/22a provides the efficient rotational alignment discussed above, whereas a virtual pivot point substantially at outer port 12a provides efficient rotational alignment about each of the x, y, and z axis. Notably, the aforementioned virtual pivot point is coincident with the intercept of each of the x, y, and z virtual pivot axes used for aligning outer ports 12a/22a and 12e/22e. In general, the x, y, and z virtual pivot axes are respectively different than the x, y, and z pivot axes about which rotation is provided.

Once the AWG 10 and FAU 20 are initially aligned, fine alignment using only the compensating mechanism 84 is performed to obtain the maximum signal intensity at both the first 72 and second 74 detectors. Optionally, an adhesive, such as epoxy resin, is applied between the optically aligned AWG 10 and the FAU 20, and the system is subject to an increased temperature. For example, temperatures ranging from about 50–150 degrees are typically suitable, while temperatures above 100° typically result in curing times less than about 5 minutes. As the epoxy begins to set, a final fine alignment, using only the compensating mechanism 84, is performed to compensate for errors introduced by the epoxy, followed by a final cure.

Once the AWG 10 and FAU 20 are coupled, the alignment between the fibre tube 5 and the AWG/FAU pair is completed. More specifically, the source switch 68 is actuated such that the DFBX3 light source 66 launches a beam of light having a predetermined wavelength into the optical fibre 34 and towards the input port of the AWG 10. Preferably, the predetermined wavelength corresponds to the first channel, i.e., the DFB is tuned to the first channel. Next, the means 80 moves the fibre tube 5 relative to the AWG/FAU pair until a maximum intensity signal is measured by the first detector 72. More specifically, the positioning mechanism 82 provides rotational movement about axes in each of the x and y directions, while the compensating mechanism 84 simultaneously provides alternate translational movement in each of the x and y directions. Since the predetermined wavelength corresponds to the wavelength of the first channel of the AWG 10, maximum light intensity measured at the first detector 72 provides a good indication of proper alignment. Finally, the fibre tube 5 and the AWG/FAU pair are optionally coupled with an adhesive, as discussed above.

Since the method and apparatus in accordance with the instant invention provides a faster and more effective alignment than prior art methods, a higher temperature can be used to set the adhesive/epoxy relative to prior art methods, thus significantly shortening the setting time and further reducing the time for alignment.

Advantageously, the use of electromagnets provides a method and apparatus for aligning optical components that is reliable, relatively inexpensive, and easy to implement. Moreover, the instant method and apparatus are applicable to the automatic or semi-automatic alignment of multi-port, multi-component optical systems.

The embodiments of the invention described above are intended to be exemplary only. Numerous other embodiments may be envisaged without departing from the spirit and scope of the invention. For example, although the embodiment shown in FIG. 3 illustrates the positioning mechanism and the compensating mechanism operating on the same optical component, it is also possible to design the apparatus such that they operate on different components.

Of course, light sources, detection systems, and positioning mechanisms, which differ from those illustrated herein are also within the scope of the instant invention, and can be used to align optical components other than those illustrated herein, such as OICs, MEMS, and laser systems.

What is claimed is:

1. A method of aligning optical components comprising the steps of:
  mounting a first optical component having an input port and an output port to a first support;
  mounting a second optical component having an input port and an output port to a second support such that the output port of the first optical component is substantially aligned with the input port of the second optical component;
  launching a reference beam of light into the input port of the first optical component such that it at least partially emerges from the output port of the second optical component to provide a reference signal indicative of an optical coupling efficiency between the output port of the first optical component and the input port of the second optical component;

providing relative movement between the first and second supports while monitoring resulting changes of the reference signal; providing a control signal indicative of the resulting changes of the reference signal; and providing further relative movement between the first and second supports in dependence upon the control signal such that a virtual pivot point for movement of one of the first and second components thereabout is formed, the virtual pivot point formed substantially at one of the output port of the first optical component and the input port of the second optical component.

2. A method of aligning optical components according to claim 1, wherein the step of providing relative movement comprises providing a positioning movement in a first degree of freedom and a simultaneous compensating movement in a second degree of freedom.

3. A method of aligning optical components according to claim 2, wherein the simultaneous compensating movement comprises a relatively fast oscillatory motion.

4. A method of aligning optical components according to claim 3, wherein each of the first and second degrees of freedom comprises one of a translational degree of freedom that is defined in one of x, y, and z-directions and a rotational degree of freedom that is defined about an axis in one of the x, y, and z-directions, the z-direction being substantially parallel to an optical axis of the output port of the first optical component.

5. A method of aligning optical components according to claim 4, wherein the simultaneous compensating movement comprises alternating translational movements in the x and y directions.

6. A method of aligning optical components according to claim 5, wherein the positioning movement comprises translational movement in the x and y directions and rotational movement about the axes in the x and y directions.

7. A method of aligning optical components according to claim 1, wherein the first optical component has a 1×N array of output ports, the second optical component has a 1×N array of input ports, and wherein the step of launching the reference beam of light into the input port of the first optical component is performed such that the reference beam of light at least partially emerges from the $N^{th}$ output port of the second optical component to provide another control signal indicative of an optical coupling efficiency between the $N^{th}$ output port of the first optical component with the $N^{th}$ input port of the second optical component.

8. A method of aligning optical components according to claim 7, comprising the step of providing relative rotational movement about the virtual pivot point while monitoring the control signal and the other control signal so as to maximize the optical coupling efficiency between the $N^{th}$ output port of the first optical component with the $N^{th}$ input port of the second optical component.

9. A method of aligning optical components according to claim 1, wherein an optical axis of the output port of the first optical component and an optical axis of the input port of the second optical component extend substantially parallel to a z axis, and wherein the step of providing relative movement comprises rotating the second optical component relative to the first optical component about one of an x axis and a y axis perpendicular the z axis while simultaneously translating the second optical component relative to the first optical component along one of the x and y axes, and wherein the step of providing further relative movement comprises further translating the second optical component relative to the first optical component in one of the x and y axes to compensate for the rotation about the one of the x axis and the y axis such that the virtual pivot point is formed.

10. A method of aligning optical components according to claim 1, comprising the step of mounting a third optical component having an input port and an output port to a third support such that the input port of the first optical component is substantially aligned with the output port of the third optical component.

11. A method of aligning optical components according to claim 10, wherein the step of providing relative movement comprises moving one of the second and third supports.

12. A method of aligning optical components according to claim 1, further comprising the step of applying an epoxy to at least one of the first and second components after a maximum coupling efficiency is obtained.

13. A method of aligning optical components according to claim 12, further comprising the step of heating the epoxy to a temperature between about 100 and 150° C. while simultaneously repeating the step of providing relative movement.

14. A method for aligning an optical channel in a first optical element with an optical channel in a second optical element, where the optical channels extend substantially parallel to a z-axis, and where the optical elements require lateral positional alignment along x and y axes that are perpendicular to each other and the z-axis, and further require angular positional alignment, the method comprising the steps of:

launching a reference signal through the optical channel of the first optical element such that it is at least partially output from the optical channel of the second optical element;

laterally moving the second optical element relative to the first optical element while monitoring the reference signal output from the optical channel of the second optical element until a position is reached where the monitored reference signal indicates substantial lateral alignment of the channels of the first and second optical elements; and angularly moving the second optical element relative to the first optical element while monitoring the reference signal output from the optical channel of the second optical element until a position is reached where the monitored reference signal indicates substantial angular alignment of the channels of the first and second optical elements, wherein the angular movement is performed while maintaining the substantial lateral alignment by further laterally moving the second optical element relative to the first optical element to compensate for changes in the lateral alignment caused by the angular movement.

* * * * *